P. MUSTONEN.
OVEN.
APPLICATION FILED NOV. 20, 1920.
1,417,404.
Patented May 23, 1922.
3 SHEETS—SHEET 2.
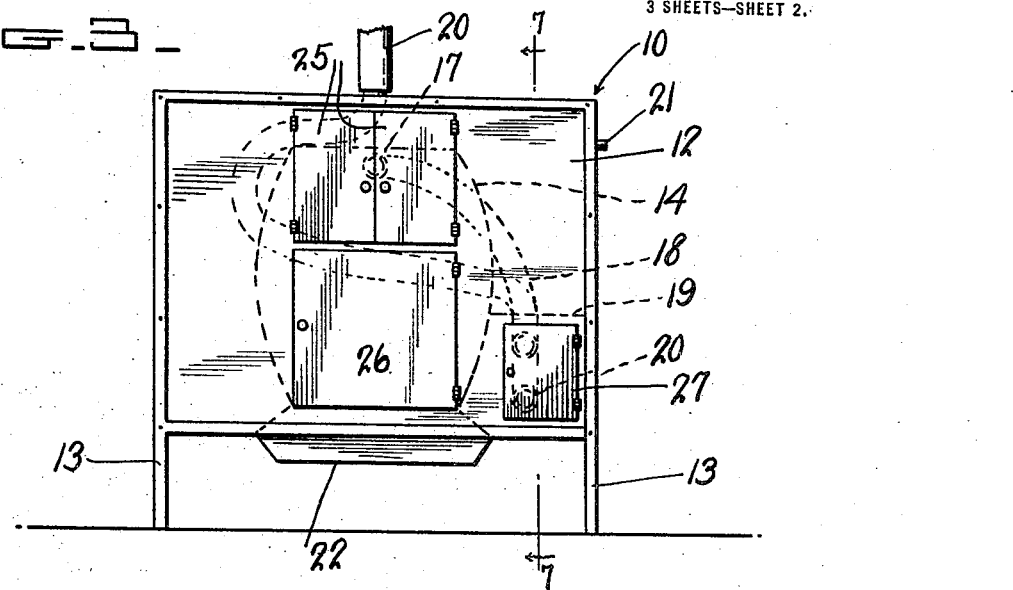
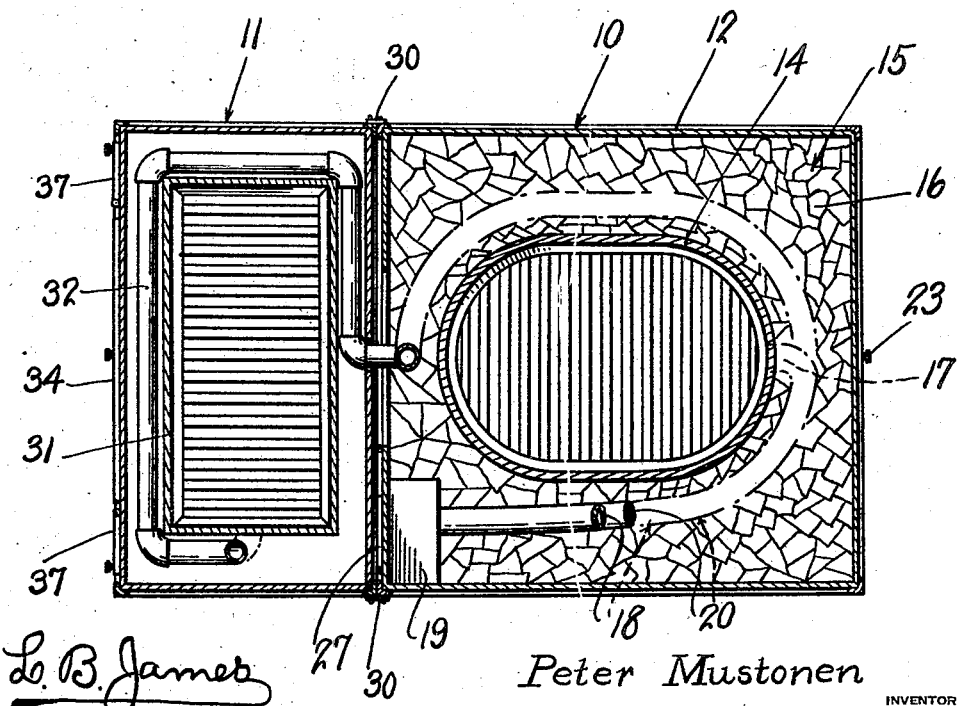
Peter Mustonen
INVENTOR

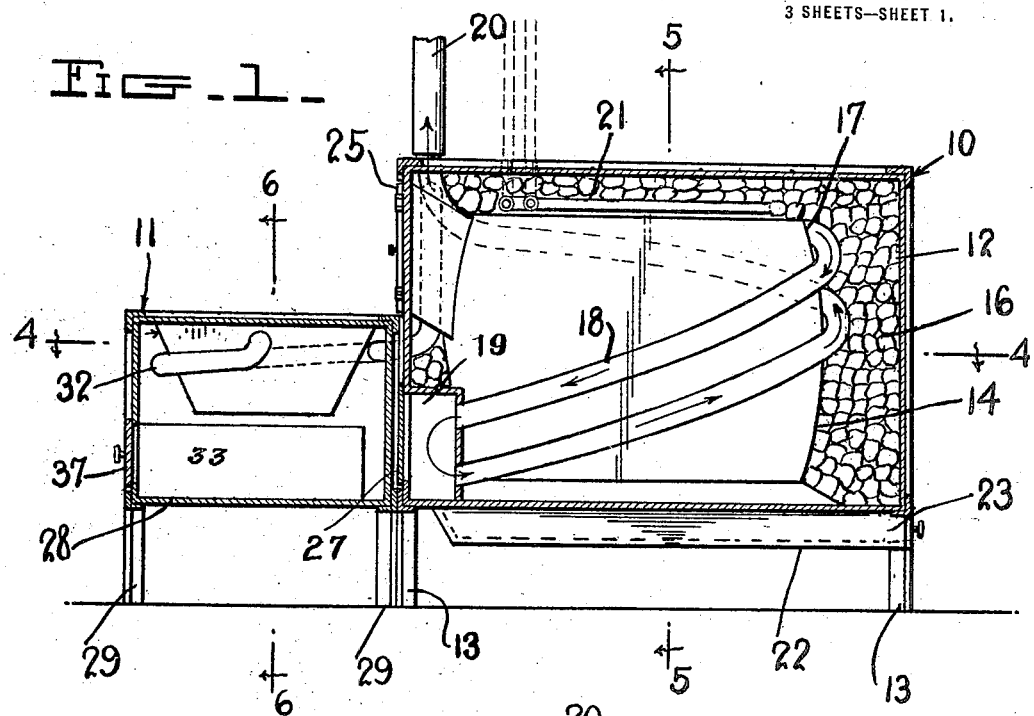
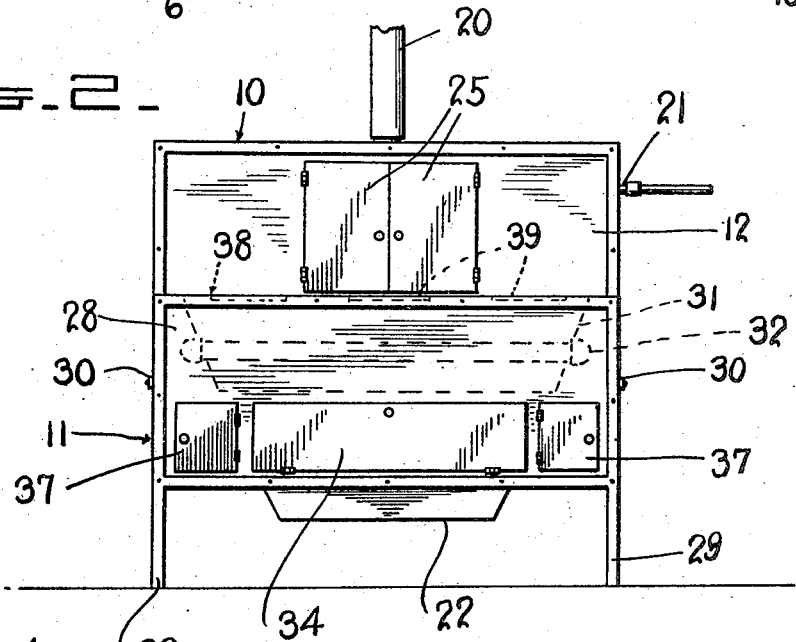

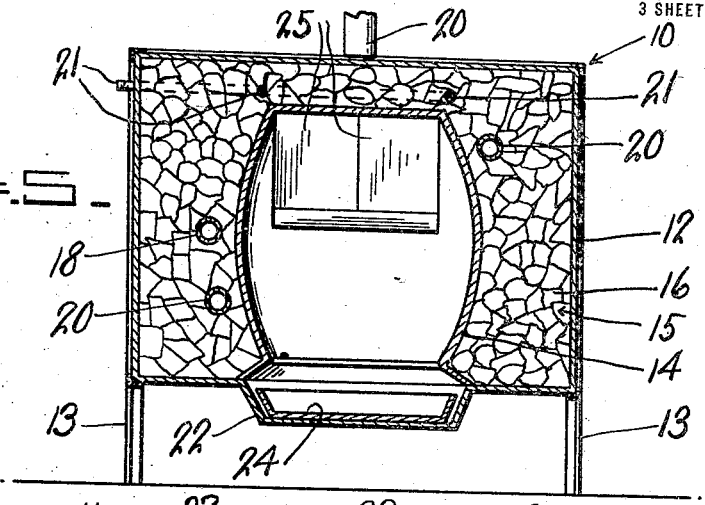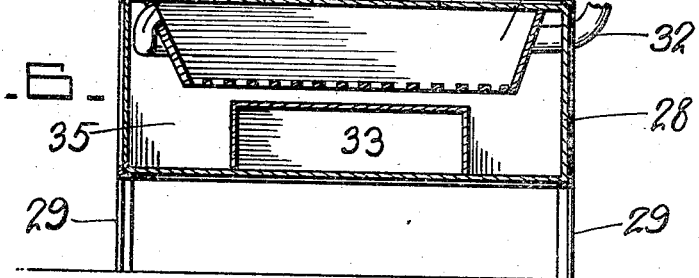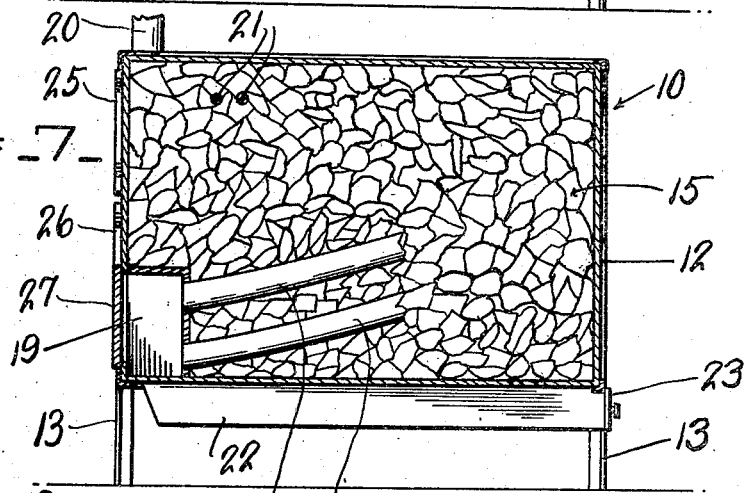

UNITED STATES PATENT OFFICE.

PETER MUSTONEN, OF SUPERIOR, WISCONSIN.

OVEN.

1,417,404. Specification of Letters Patent. Patented May 23, 1922.

Application filed November 20, 1920. Serial No. 425,587.

*To all whom it may concern:*

Be it known that I, PETER MUSTONEN, a citizen of the Republic of Finland, residing at Superior, in the county of Douglas and State of Wisconsin, have invented new and useful Improvements in Ovens, of which the following is a specification.

This invention relates to stoves and has for an object the provision of a stove which is formed in separate sections to provide a heater section and a cooker section, either one of which may be used separately, or associated to provide a single unit.

Another object is the provision of a heater in which the fire box may be surrounded by heat retaining elements, so as to increase the amount of radiation and to store an appreciable amount of heat after the fire is extinguished.

Another object is the provision of a cooking stove which includes a plurality of fire boxes or fire compartments, which surround an oven, so that the products of combustion may pass entirely around the latter and thus insure an even cooking of its contents.

Other objects and advantages of the invention will appear as the following description is read in connection with the accompanying drawings.

In the drawings:—

Figure 1 is a view in side elevation showing the invention arranged as a single unit.

Figure 2 is a front elevation of the same.

Figure 3 is a front elevation with the cooking section removed.

Figure 4 is a horizontal section on the line 4—4 of Figure 2.

Figure 5 is a vertical section on the line 5—5 of Figure 2.

Figure 6 is a similar view on the line 6—6 of Figure 2.

Figure 7 is a vertical section on the line 7—7 of Figure 3.

Referring in detail to the drawings, wherein like characters of reference denote corresponding parts, the invention as shown comprises a stove which is formed of a heating section 10 and a cooking section 11.

The heating section includes an outer shell or casing 12, which is supported upon legs 13 and which has located therein a fire box 14. This fire box is spaced from the top, side and rear walls of the casing 12 for the purpose of providing a heating chamber 15, the latter preferably containing heat retaining elements 16, such as stones or the like.

These heating elements 16 will become thoroughly heated from the products of combustion and will add to the radiation of the stove and will in addition, furnish an appreciable amount of heat after the fire within the fire box 14 is extinguished.

Surrounding the fire box 14 and communicating with the interior thereof as indicated at 17, is a smoke pipe 18. This smoke pipe also communicates with a compartment 19 which in turn is in communication with a smoke outlet pipe 20, so that the smoke in the fire box may be conducted to the atmosphere in the usual manner.

The heating section may be used for the purpose of heating a building through the usual hot water flues, or a coil of pipes 21 may be located within the casing 12 above the fire box so that the heater may be used either for the purpose of generating steam or for heating water.

The bottom of the casing 12 is formed into an ash pit 22, which is provided with a clean out door 23 and which may also have located therein an ash pan or tray 24.

The front of the casing 12 is provided with feed doors 25 which communicate with the ash pit and with a removable door 26, the purpose of which will be hereinafter apparent. In addition, the front of the casing is provided with a clean out door 27 which is in communication with the smoke compartment 19.

The cooking section 11 is formed of a casing 28 which is supported upon legs 29. This casing is constructed entirely separate from the casing 12 and may be detachably connected to the latter through the medium of a suitable connecting means 30.

Located within the casing 28 is a fire box 31, which is surrounded by a smoke pipe 32. One end of this pipe communicates with the interior of the fire box 31 and its opposite end enters the heating section through the door 26, which may be removed when the heating and cooking sections are used as a single unit. The smoke from the fire box 31 will thus be conducted upward through the outlet flue 20.

Located within the casing of the cooking section is an oven 33, which is provided with a door 34, while located upon opposite sides of this oven is a fire box 35, the latter extending across the top of the oven beneath the fire box 31, so that the said oven is surrounded by this fire box upon its top and sides. Doors 37 are provided upon opposite sides of the oven so that access may be had to the fire box 35 upon either side. The upper wall of the casing 28 may be provided with openings 38 having removable closures 39 so as to provide the usual cooking holes.

The invention is susceptible of various changes in its form, proportions and minor details of construction and the right is herein reserved to make such changes as properly fall within the scope of the appended claims.

Having described the invention what is claimed is:—

1. A stove comprising a heating section, a fire box located therein and spaced from the side and rear walls thereof to provide a heating chamber, heat retaining elements filling said chamber, a smoke pipe surrounding the fire box and communicating with the interior thereof and a cooking section having detachable engagement with the heating section.

2. A stove comprising a heating section, a fire box disposed therein, a smoke pipe surrounding said fire box and communicating with the interior thereof, a smoke compartment disposed in said section and communicating with said pipe, a smoke outlet pipe connected to said chamber and extending through the top of said section, a cooking section detachably secured to said heating section, a fire box disposed in said cooking section, an oven located beneath the fire box in said cooking section and a smoke pipe surrounding the fire box in said cooking section, communicating with the interior thereof and with the smoke chamber in said heating section.

In testimony whereof I affix my signature.

PETER MUSTONEN.